United States Patent [19]

Lea et al.

[11] Patent Number: 5,031,846
[45] Date of Patent: Jul. 16, 1991

[54] FILAMENT WINDING MACHINE

[76] Inventors: Richard H. Lea, 15607 Antietam Ave., Baton Rouge, La. 70817; Su-Seng Pang, 7844-B Jefferson Place Blvd., Baton Rouge, La. 70809; Ivan Curiel, 520 Dowlen Apt. 61, Beaumont, Tex. 77706; Rajiv Jindia, 7500 Bellerive Apt. 2500, Houston, Tex. 77036; Lloyd McClatchey, 1043 Margate St., Pearland, Tex. 77584

[21] Appl. No.: 373,985
[22] Filed: Jun. 29, 1989
[51] Int. Cl.$^5$ .................. B21H 17/00; F16H 27/02
[52] U.S. Cl. .................. 242/7.220; 156/189; 156/195; 156/429; 156/456
[58] Field of Search .................. 242/7.21, 7.22; 156/189, 185, 195, 429, 430, 431, 446, 448, 456

[56] References Cited

U.S. PATENT DOCUMENTS

| | | | |
|---|---|---|---|
| 3,397,847 | 8/1968 | Thaden | 242/7.22 |
| 3,552,665 | 1/1971 | Kelly | 156/446 X |
| 3,562,063 | 2/1971 | Gibbs | 156/189 X |
| 4,373,680 | 2/1983 | Polge | 242/7.21 X |
| 4,541,887 | 9/1985 | Carter | 242/7.22 X |

Primary Examiner—Katherine Matecki
Attorney, Agent, or Firm—Llewellyn A. Proctor

[57] ABSTRACT

Apparatus for the formation of laminar, fiber-reinforced resin composite tubes of elbow shape. The apparatus, a filament winding machine, is employed by winding a continuous strand, or plurality of strands, of a resin-wetted yarn, roving, or filament about an elbow-shaped mold. The apparatus combination is constituted of a hollow shaft of curvilinear shape on which an elbow-shaped mold can be telescopically mounted. The two terminal ends of the hollow shaft can be journalled in place and the hollow shaft rotated thereabout. The combination also includes a sprocket-supported chain and connecting cable, the cable portion of which passes through the interior of the hollow shaft. The two terminal ends of the cable can be connected to the mold when the latter is mounted thereon so that reciprocal movement of the chain and cable can oscillate the mold upon the hollow curvilinear shaft as the shaft is rotated. Motor means are provided for producing both rotational and translational motion of the mold to wind the resin-impregnated filament perpendicularly to the axis of the mold while butting each row of applied filament side to side one row against another as the resin-impregnated filament is drawn from a supply source by rotation of the curvilinear hollow shaft, and translational motion of the mold.

12 Claims, 4 Drawing Sheets

FILAMENT WINDING MACHINE

FIELD OF THE INVENTION

This invention relates to apparatus for winding a yarn, or filament, particularly a resin-wetted, or resin presaturated, yarn or filament, upon a mold or mandrel of elbow shape, the formation of an elbow-shaped fiber-reinforced composite, and separation of the elbow-shaped fiber-reinforced composite from the mandrel or mold.

BACKGROUND

In recent years pipes and conduits have been largely constructed of synthetic plastics, especially fiber-reinforced composites, or fiber-reinforced piping. These materials are far less susceptible to corrosion than metal pipe, and a pipe constructed of fiberglass reinforced plastic generally weighs only about one-fifth as much as its steel equivalent. Fiberglass piping, and piping systems made of corrosion resistant resins are extensively used in the transport of corrosive chemicals.

In the construction of a fiberglass piping system it is not only necessary to form straight tubes, but also connectors and fittings. These components are of laminar construction and constituted of an inner layer which interfaces with the transported flowing fluid. The inner layer is formed by placing a layer relatively rich in resin, with relatively low fiberglass content, directly upon a mold, or mandrel, since the inner surface of the composite is that which will come into intimate contact with the transported chemical fluid. The next, and subsequent layers of the composite are less rich in resin, and have higher concentrations of fiberglass to provide strength to the composite. Thus, the inner layer has a low fiberglass:resin ratio, and the outer layer, or layers, a high fiberglass:resin ratio. In forming composites, the layers are often applied as strips and mats, or both, wrapped about a mold, or mandrel, and impregnated with resin to form the fiber-resin layers. The fibers of adjacent layers are generally laid in different directions, or orientations, and then set, or cured and hardened to attain a mechanically strong finished composite. The finished composite is then separated from the mold.

Whereas straight fiberglass-reinforced resin composite tubes have been readily fabricated in this manner, and are easily separated from the mandrel, the formation and separation of elbow-shaped connections, and fittings, have not. Whereas laminar, fiberglass reinforced resin composite tubes have been formed, e.g. on an elbow-shaped steel pipe rotated via an end affixed to a motor shaft, which provided the annular molding surface, and the tubular structure thereafter separated therefrom - this is done only with much difficulty; and with many disadvantages. Albeit the motor rotates the elbow-shaped mold, or mandrel, and thus provides a machine having the needed winding motion, the fiberglass, as a matting, must be applied by hand. This results in increased manual labor, and cost. The matting itself is expensive; more expensive e.g. than a roving, and of lower mechanical strength. There is thus an acute need to the industry for better means for forming fiber-reinforced resin composite tubes of elbow shape, and for the separation of completed elbow-shaped fiber-reinforced resin composite tubes from an annular molding surface.

OBJECTS

It is, accordingly, a primary object of this invention to supply these and other needs.

A particular object of this invention is to provide a novel apparatus for the formation of laminar, fiber-reinforced resin composite tubes of elbow shape, as well as means for the separation of the elbow-shaped composite tube from the annular molding surface.

A further, and more particular object is to provide apparatus for winding a continuous filament, or roving, especially a resin-wetted filament, or roving, upon a mold, or mandrel, of elbow shape to form a laminar, fiber-reinforced resin composite tube of corresponding shape, and means for the ready separation of the finished composite tube from the mold, or mandrel.

THE INVENTION

These objects and others are achieved in accordance with this invention embodying apparatus for winding a continuous strand of a resin-wetted yarn, roving or filament, about an elbow-shaped mold to form a pipe fitting or corresponding shape. The filament winding apparatus is comprised of a rotatable curvilinear hollow shaft, a mold which can be telescopically mounted thereupon, a sprocket-supported endless cable passed through the interior of the hollow shaft and attachable to the mold, and motor means—preferably, a first motor means operatively associated with the hollow shaft for rotation of said hollow shaft, and second motor means operatively associated with said cable for effecting the translational movement of said elbow-shaped mold upon the hollow shaft while the latter is being rotated—producing both rotational and translational motion of the elbow-shaped mold to wind said resin-wetted filament perpendicularly to the axis of said mold while butting each row of applied filament side to side one row against another as the resin-wetted filament is drawn from a supply source by rotation of said hollow shaft, and wound upon the mold. After the composite has been formed, set and cured, the composite fitting can be removed from the mold.

These and other features of a preferred filament winding apparatus, as well as its principle of operation, will be better understood by reference to the following drawing and detailed description which makes reference to the drawing. In the drawing, similar numbers are used to represent similar parts or components, and subscripts are used with a given whole number to designate a sub-feature of a given part, or component.

In the drawing:

FIG. 1 depicts a rear elevation view of a filament winding apparatus, inclusive of a housing with panels removed to expose the various apparatus components and their relation one to another; this including a rotatable hollow curvilinear shaft, mold telescopically mounted thereon, a sprocket-supported cable passing through the hollow curvilinear shaft and attached to a mold cable, forming in effect an endless chain, for supplying translational motion thereto, and motor means for supplying the rotational motion of the hollow shaft and translational motion for the mold.

FIG. 2 depicts an enlarged sectional view of the hollow curvilinear shaft, and mold.

FIG. 3, a view from line 3—3 of FIG. 1, depicts a side elevation view of the filament supply source and resin bath through which filaments are passed for presaturation with the resin prior to winding the resin-wetted filament upon the mold. This figure also shows the mold in some detail, and the manner in which it is attached to the cable and chain for translational movement upon the hollow curvilinear shaft.

FIG. 4 is an enlarged section showing the mold and its structural components in better detail.

DETAILED DESCRIPTION

Figure 1:
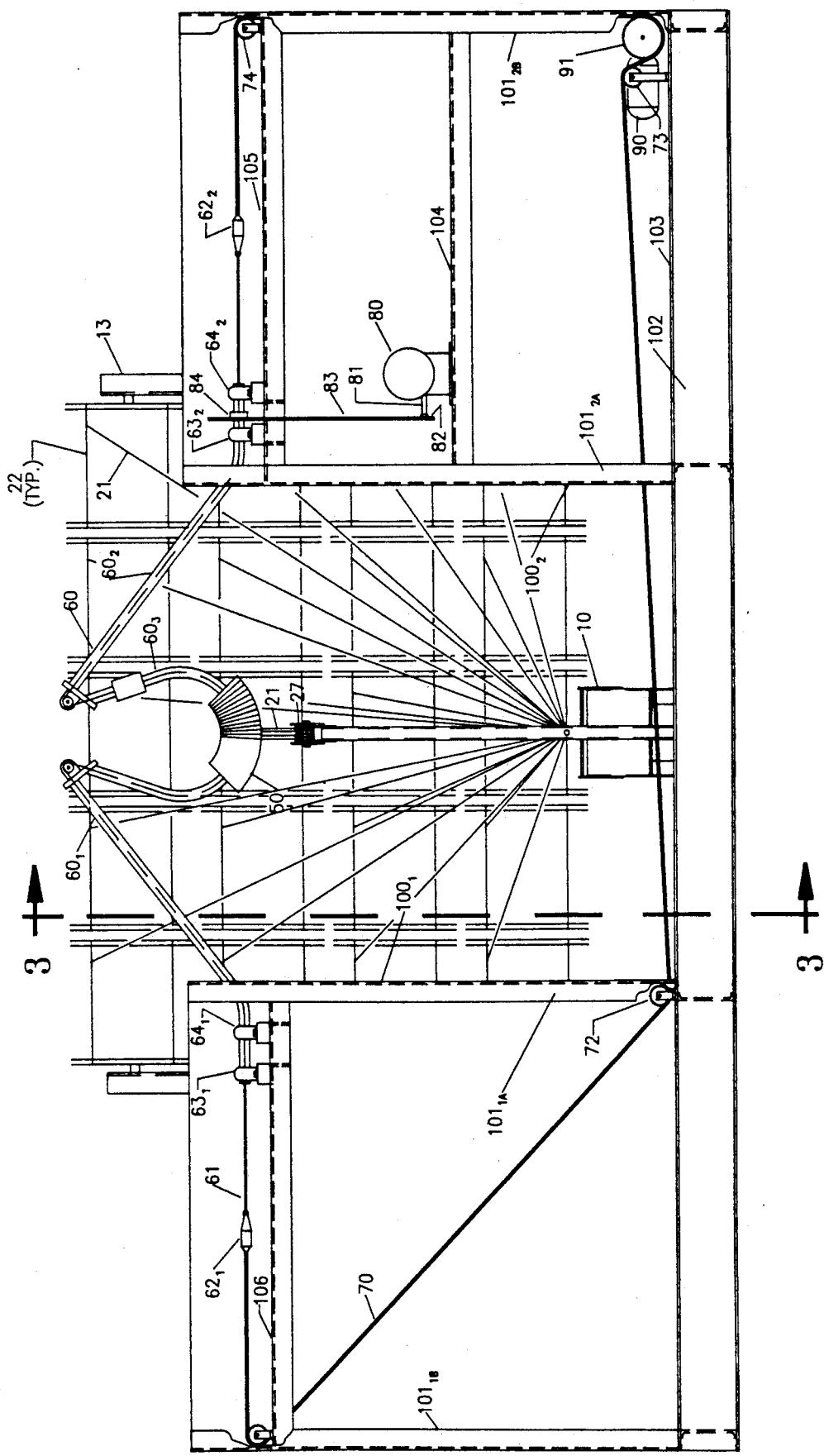
Figure 2:
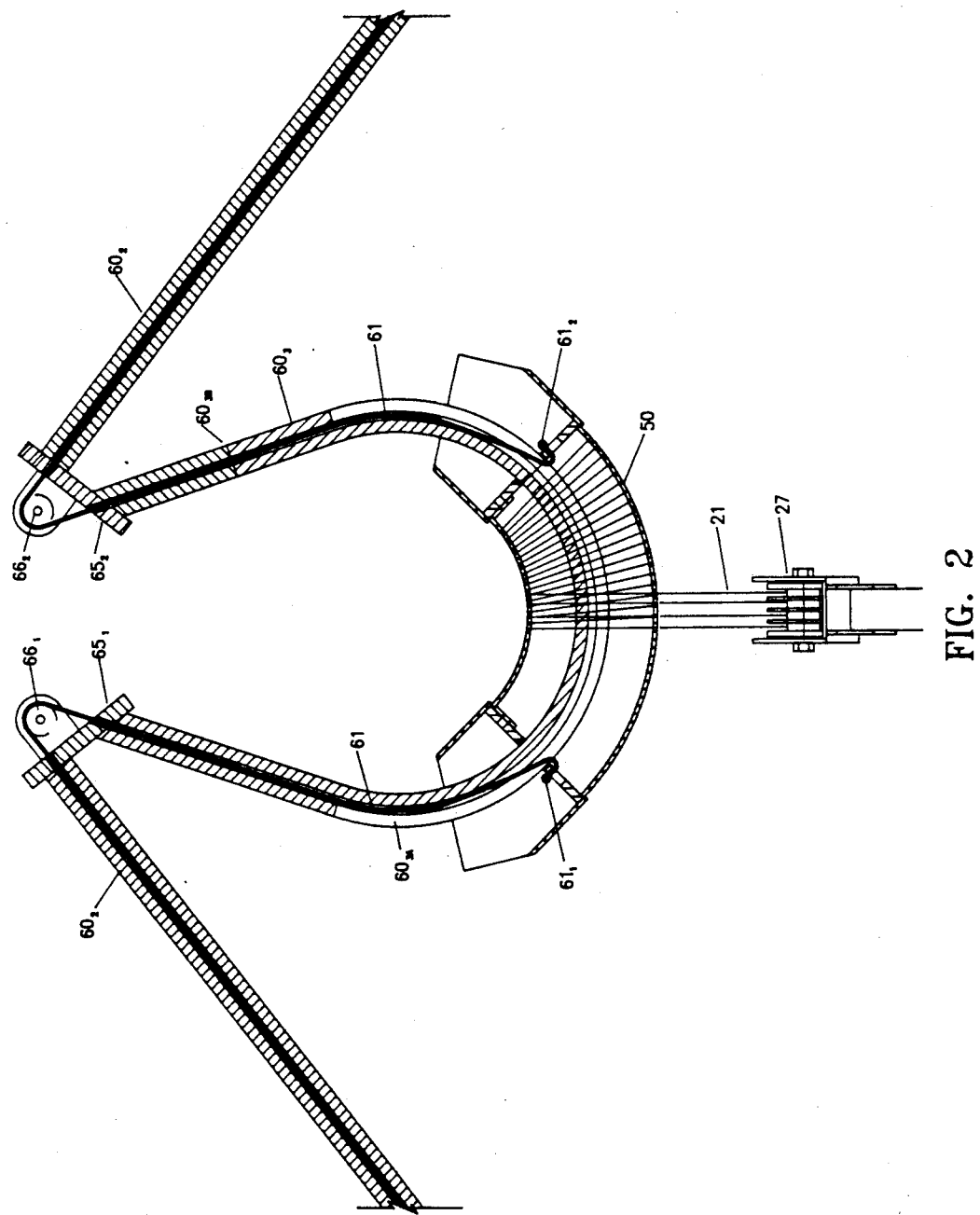
Figure 3:
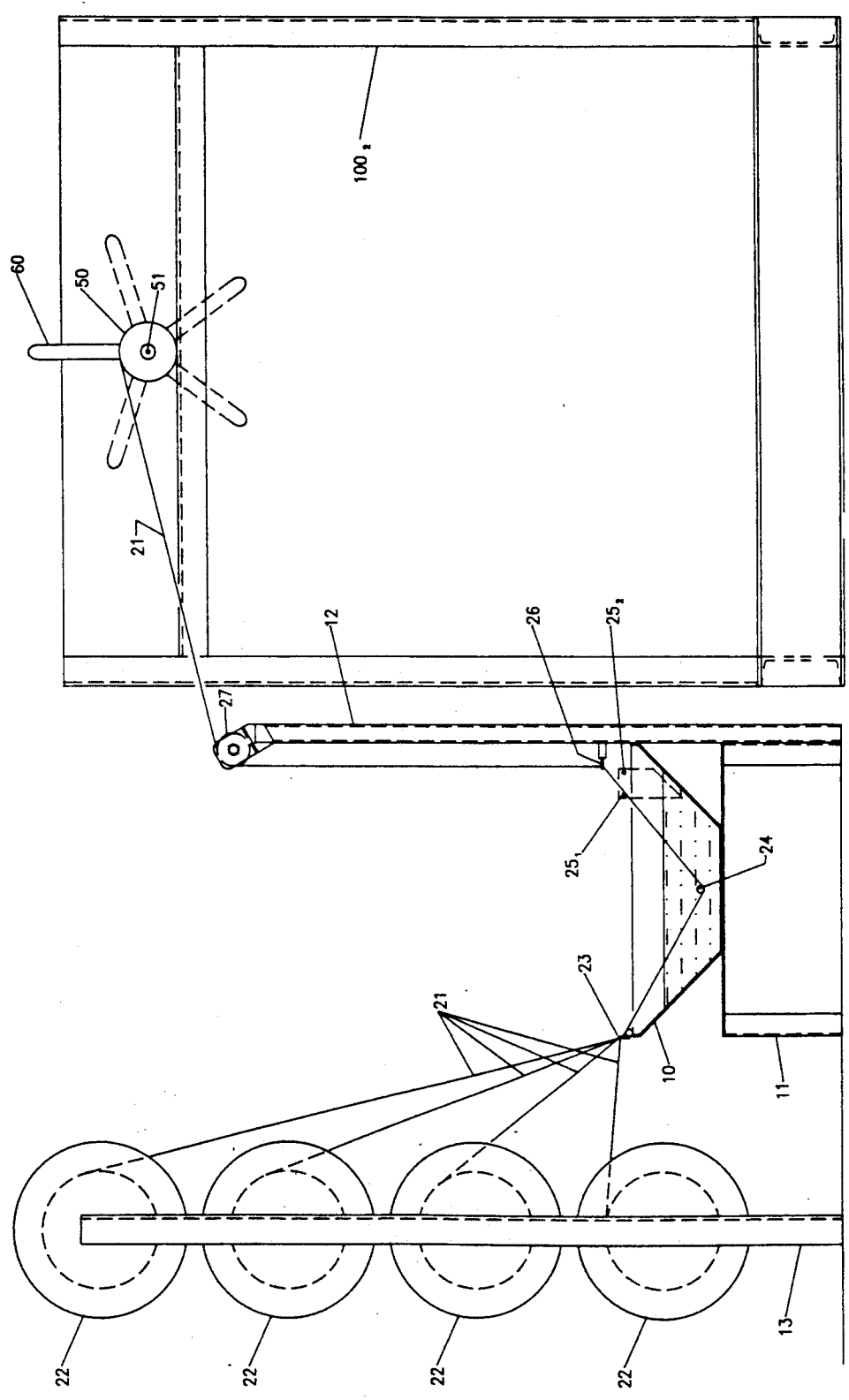

Referring generally to the figures, first principally to FIGS. 1 through 3, there is shown a resin bath 10 through which is passed multiple strands of fiberglass filaments or rovings withdrawn from filament bundles 22, and the resin-wetted filaments 21 then directed onto an elbow-shaped mold 50 rotated at constant velocity. The filaments 21 are pulled onto the mold 50 by the rotating curvilinear hollow shaft 60 formed of three segments $60_1$, $60_2$, $60_3$, the yoke-shaped center section $60_3$ of which carries the elbow-shaped mold 50. A sprocket supported cable 61 is passed through the interior opening through the curvilinear hollow shaft 60, the cable 61 being attached to the mold 50 through a peripherical slot $60_{3A}$ in the yoke-shaped center shaft section $60_3$. The cable 61 forms a closed loop with the chain 70 to which its two terminal ends are attached. A motor 80, the drive shaft 81 of which rotates an input sprocket 82, directly affixed thereto, supplies translational motion to the chain 83 to rotate the sprocket 84 thereby supplying rotational motion to the hollow shaft 60. The cable 61 is interfaced with chain 70 via a pair of swivels $62_1$, $62_2$, which prevent the cable from twisting during rotation of the hollow shaft 60. Translational input, or input necessary to oscillate the mold 50 along the segment $60_3$ of the hollow shaft 60 is provided by the motor 90. The shaft of the motor 90 is directly connected to a sprocket 91 which is linked with the chain 70. The translational motion of the chain 70 is provided by reversing the direction of drive by the motor 90. The combined rotation of the hollow shaft 60 and translation of the mold 50 along the segment $60_3$ of the hollow shaft 60 produces the motions necessary to withdraw the filaments from the supply source and wind the resin-wetted filaments 21 upon the mold 50. A housing is provided for component protection and safety.

The housing, as shown by specific reference to FIG. 1, is constituted of two spaced apart cabinets $100^1$, $100^2$ each of which is provided with interior vertically oriented corner posts 101 ($101_{1A}$, $101_B$ etc.) which serve as support members for walls, not shown. The posts 101 are mounted, via their bottom terminal ends, above steel I-beams 102 which support a floor plate 103, horizontally oriented shelves 104, 105, 106 which are supported by the corner support posts 101, and enclosing side and top walls (not shown). A chain 70 is supported upon and guided by sprocket 71 located on shelf 106, sprockets 72, 73 located upon the floor plate 103 and sprocket 74 located on shelf 105.

The two terminal ends of the chain 70 are affixed through swivel connections $62_1$, $62_2$ to the two terminal ends of the cable 61 providing a closed loop, the cable portion of which is extended from the two sides thereof through the interior of the curvilinear hollow shaft 60 and attached to the mold 50. The curvilinear hollow shaft 60, it will be observed, is formed of two alternately disposed end sections $60_1$, $60_2$ of similar shape, and a terminal end of a straight section of each of the two members is journalled between two spaced pillar block bearings $63_1$, $64_1$ and $63_2$, $64_2$, respectively, located on alternately disposed top plates 105, 106 within the cabinets $100_1$, $100_2$, respectively. The two terminal ends of the peripherally slotted hollow yoke-like member $60_3$ are affixed via end pieces $65_1$, $65_2$, best shown by reference to FIG. 2, to the opposite terminal ends of the two alternately disposed end sections $60_1$, $60_2$ of the hollow shaft 60. Thus, the two ends of sections $60_1$, $60_2$ are adjoined upon members $65_1$, $65_2$ as are the two ends of the yoke-like member $60_3$; forming in effect a unitary junction. The hollow yoke-like section member $60_3$ is provided with a peripheral slot $60_{3A}$, and a disconnect break $60_{3B}$ is provided so that the member can be opened to accommodate the elbow-shaped mold 50 which is removably mounted and can be telescopically fitted upon yoke-like member $60_3$. The mold 50 can be attached via ball connections $61_1$, $61_2$ to the two ends of the cable 61. Thus, the two ends of the cable 61 are extended through the two curvilinear hollow sections $60_1$, $60_2$, respectively, across pulleys $66_1$, $66_2$, respectively, into the two sides of the yoke-like member $60_3$, and outwardly through the peripheral slot $60_{3A}$ of the yoke-like member $60_3$ and into the mold 50 to which the ball connections $61_1$, $61_2$ are attached. Movement of the cable 61 will thus produce a proportional, translational movement of the mold 50 upon the yoke-like member $60_3$. The mold 50 can thus be moved back and forth, or oscillated, upon the yoke-like member $60_3$ concurrently with the rotation of the curvilinear hollow shaft 60 as required during the winding operation. The pair of swivels $62_1$, $62_2$, by means of which the cable 61 and chain 70 are secured together to form a closed loop, are required to prevent twisting of the cable and chain during the filament winding operation.

In setting up to conduct a filament winding operation, the yoke-like member $60_3$ is pulled aside at the break $60_{3B}$, the mold 50 is installed in place upon the yoke-like member $60_3$, and the yoke-like member repositioned. The two ends of the cable 61 are attached via ball connections $61_1$, $61_2$ to the mold 50. Resin is brushed upon the exterior mold surface. A surfacing veil, generally consisting of two layers of cloth-like matting known as "Nexus", is applied by hand. The resin presaturated roving, or filament, is then "started" onto the mold and the winding operation is begun. The filaments are wrapped perpendicularly to the central axis of the mold 50 while butting each filament side to side.

Referring to FIG. 3, first generally, there is shown a resin bath 10 supported upon a four legged table 11 provided with a forward central upright, or vertical post 12 at the very top of which is affixed a comb former 27, and at the center of which is provided an eye 26. Fibers guided through the eye 26 pass to the comb former 27, the latter ensuring an even spacing of the strands of fiber as they are laid therefrom upon the mold 50. Filament bundles 22 supply the strands of fiber, or filaments. Rovings, or filaments 21, are withdrawn from filament bundles 22 fed through guide eye 23 into the resin bath 10. Within the bath 10, the filaments 21 are passed underneath a stainless steel bar 24, the bar 24 holding the filaments 21 beneath the surface of the resin to provide a non abrasive wiping action which removes entrapped bubbles of air. As the filaments exit the bath 10 they are squeezed between a pair of stainless steel bars $25_1$, $25_2$ to remove excess resin, and then guided through an eye 26 to the comb-type former 27 which assures an even spacing between the filaments 21 as they are laid onto the surface of the mold 50. The filaments 21 are unwound from the bundles 22, passed through the resin bath 10 and pulled onto the mold 50 by the constant velocity rotation of the curvilinear hollow shaft 60. The hollow shaft 60 rotates at a speed ranging from about 20 to about 60, preferably from about 20 to about 40 revolutions per minute (r.p.m.). The speed of the rotational and translational motors can be adjusted, thus to provide a good winding of the filaments, e.g., fiberglass filaments, as may be desired for different winding situations.

It will be observed by continuing the reference to FIG. 3 that the center of the yoke-like member $60_3$ of the hollow shaft 60 during the winding operation rotates in an essentially fixed position, while the hollow shaft sections $60_1$, $60_2$ rotate more widely about a center point 51. Simultaneously, during the rotation of the hollow shaft 60 the mold 50 is oscillated, or translated progressively from side to side through this center upon which the filaments from the comb-like member 27 are aligned. The oscillation of the mold 50 in this manner, while so aligned, causes the filaments 21 to be wrapped the full length of the mold 50. By translation of the mold 50 from side to side through the center point 51 of the yoke-like portion of the hollow shaft, while the filaments are fed from a fixed position perpendicular to the axis of the mold 50, each of the resin-wetted filaments 21 are laid down side by side and abutted one against the other to cover the mold 50 from one end to the other with the resin-wetted filaments. The combined rotation of the hollow shaft 60 and translation of the mold 50 along the central segment $60_3$ of the hollow shaft 60 thus produces the desired winding.

The central axis of the mold 50 is progressively translated through the center point 51 as the filaments 21 are unwound from the filament bundles 20, wetted with resin, and directed through comb-like member 27 onto the revolving mold surface. The mold 50 is oscillated through one or more end to end movements, and wrapped from end to end in this manner until the entire mold surface is covered by one or more layers of the resin wetted filaments. An outside layer, a surfacing veil also consisting, e.g., of Nexus can be applied in the same fashion as the first surfacing veil layer to complete formation of the elbow-shaped composite structure. The mold 50 can be removed from the yoke-like member $60_3$, the composite structure separated therefrom and the winding process repeated as the composite structure is cured.

Figure 4:
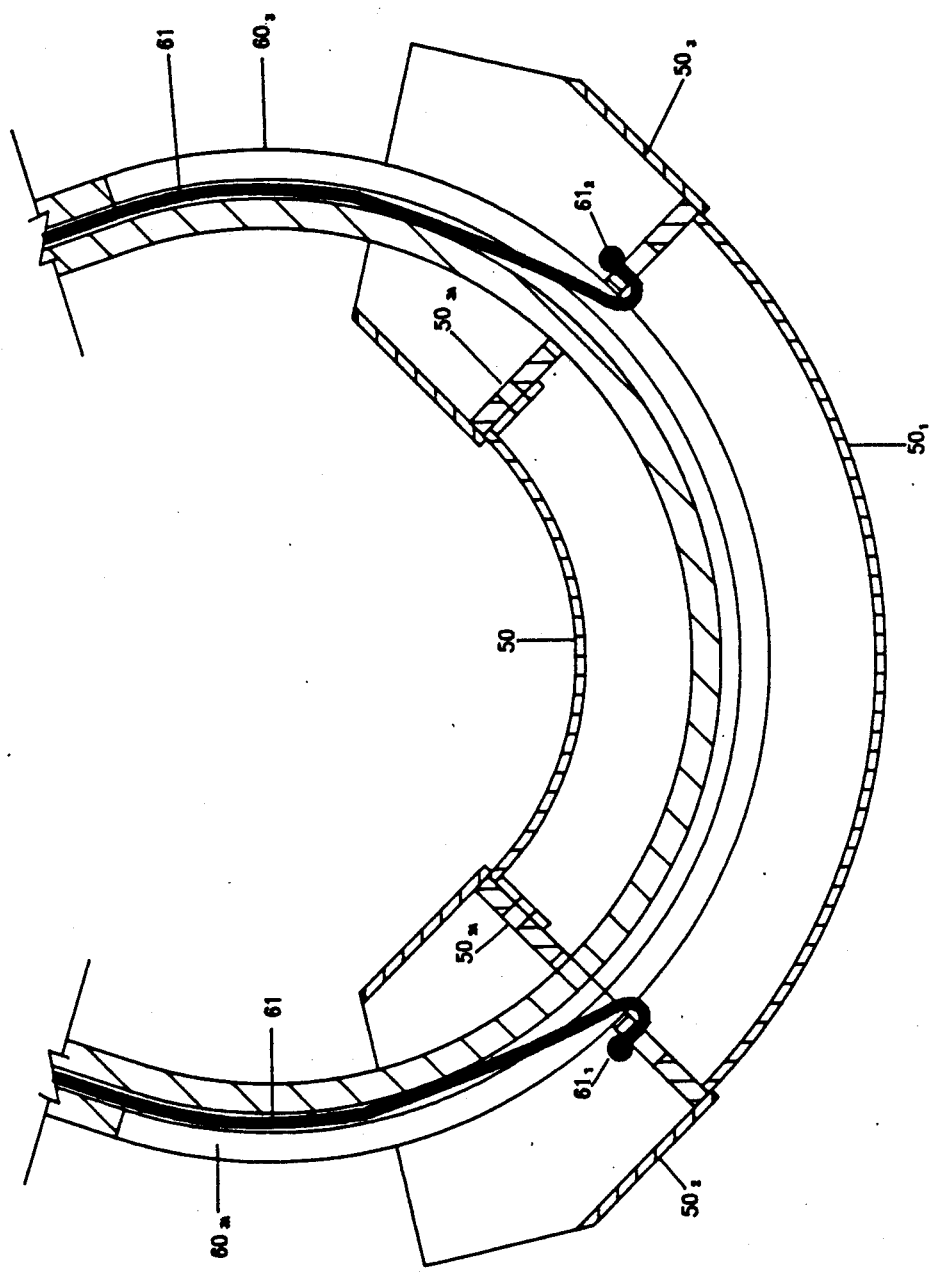

The mold 50 is preferably of a segmented design to permit easy assembly, and disassembly to facilitate release of the elbow-shaped composite structure from the mold. The mold 50, as best shown by reference to FIG. 4, is formed of an arched central section $50_1$ and end caps $50_2$, $50_3$ which are bolted thereupon. The outer face of each end of the central member $50_1$ is fitted with a ring $50_{2A}$, $50_{3A}$ provided with tangential tabs with openings (not shown) certain of which are internally threaded to provide a means of securing the end caps $50_2$, $50_3$ to the central member $50_1$, while others are access openings within which the ball connections $61_1$, $61_2$ at the terminal ends of the cable 61 can be readily inserted for affixing the mold 50 to the cable 61. Conversely, this provides an easy disconnect feature for ready separation of the mold 50 from the cable 61, and yoke-like shaft $60_3$. The center mold segment $50_1$ is suitably separable, after removal of end caps $50_2$, $50_3$, into two component parts of tapered elongate shape $50_{1A}$, $50_{1B}$ to facilitate removal of the mold from inside the elbow-shaped fiber reinforced composite after curing. Suitably, the mold 50 is of stainless steel construction.

It is apparent that various modifications and changes can be made e.g. in the size, shape and materials of construction, without departing the spirit and scope of the invention.

Having described the invention, what is claimed is:

1. In apparatus for winding a continuous roving of resin-impregnated filament about an elbow-shaped mold to form a pipe fitting of corresponding shape, the combination which comprises a hollow shaft of curvelinear shape, with two terminal ends, and means for telescopically mounting said elbow-shaped mold upon said hollow shaft, the two terminal ends of the hollow shaft being journalled on a supporting frame and the hollow shaft rotated thereabout, a sprocket-supported chain and two connecting cables, connected end-to-end to the ends of the chain, the cables passing through the interior of said hollow shaft, the two free ends of the cable comprising means for connecting the cable to the mold when the mold is mounted on the hollow shaft, such that reciprocal movement of the chain and cable will oscillate said mold upon said hollow, curvilinear shaft, and motor means for producing both rotational and translational motion of the mold to wind said resin-impregnated filament perpendicular to the axis of said mold while butting each row of applied filament side to side one row against another as the resin-impregnated filament is drawn from a supply source by rotation of said curvilinear hollow shaft, and mold mounted thereon.

2. The apparatus of claim 1 wherein a swivel connection is provided adjacent the connecting means between the cable and chain to avoid twisting the cable and chain as the curvilinear hollow shaft is rotated.

3. The apparatus of claim 1 wherein the motor means is comprised of two motors, one for supplying the translational motion required for oscillation of the mold upon the curvilinear hollow shaft, and the other for rotation of the curvelinear hollow shaft.

4. The apparatus of claim 1 wherein a swivel connection is provided adjacent the connecting means between the cable and chain to avoid twisting the cable and chain as the curvilinear hollow shaft is rotated, and the motor means is comprised of two motors, one for supplying the translational motion required for oscillation of the mold upon the curvilinear hollow shaft, and the other for rotation of the curvilinear hollow shaft.

5. The apparatus of claim 1 wherein the curvilinear hollow shaft is provided with breakaway means for separation of the shaft for mounting the mold thereupon.

6. The apparatus of claim 1 wherein the curvilinear hollow shaft is formed of a plurality of connecting segments, at least one of which forms a central yoke-like segment on which the mold can be mounted.

7. The apparatus of claim 6 wherein the curvilinear hollow shaft is constituted of a pair of hollow shaft portions, and a peripherally slotted hollow yoke-like member having two ends which can be adjoined to each of said pair of hollow shaft portions and upon which the mold can be telescopically mounted.

8. The apparatus of claim 7 wherein the hollow yoke-like member is provided with breakaway means for separation of the shaft for mounting the mold thereon.

9. In apparatus for winding a continuous roving of a resin-impregnated filament about an elbow-shaped mold to form a pipe fitting of corresponding shape the combination which comprises

- a curvelinear hollow shaft comprising a pair of hollow shaft portions, and a peripherally slotted hollow yoke-like member having two terminal ends which are adjoined to a terminal end of each of said hollow shaft portions, and means for telescopically mounting elbow-shaped mold on said yoke-like member,
- a sprocket-supported chain and two connecting cables, connected end-to-end to the ends of the chain, the cables passing through the interior of said curvelinear hollow shaft and being movable therein in either direction, said cables extending through the peripheral slot of said peripherally slotted hollow yoke-like member of said hollow curvelinear shaft, the cables including means on their free ends for attachment to said elbow-shaped mold when the mold is mounted on said yoke-like member such that reciprocal movement of the cables will oscillate said mold upon said hollow yokel-like member,
- a swivel connection located adjacent the attachment means between the cable and chain to prevent twisting of the cables and chain as the curvelinear hollow shaft is rotated, and
- motor means for producing both rotational and translational motion of the elbow-shaped mold to wind said resin-impregnated filament perpendicularly to the axis of said mold while butting each row of applied filament side to side one row against another as the resin-impregnated filament is drawn from a supply source by rotation of said mold.

10. The apparatus of claim 9 wherein the motor means is comprised of two motors, one for supplying the translational motion required for oscillation of the mold upon the curvelinear hollow shaft, and the other for rotation of the curvelinear hollow shaft.

11. The apparatus of claim 9 wherein the curvilinear hollow shaft is provided with breakaway means for separation of the shaft for mounting the mold thereupon.

12. The apparatus of claim 9 wherein the combination further includes a resin bath, a filament supply source, means for guiding the filament through the resin bath, and means for supplying the resin-wetted filament to the elbow-shaped mold.

* * * * *